June 4, 1963
M. HINDEN
3,092,714
WELDING APPARATUS
Filed June 15, 1961
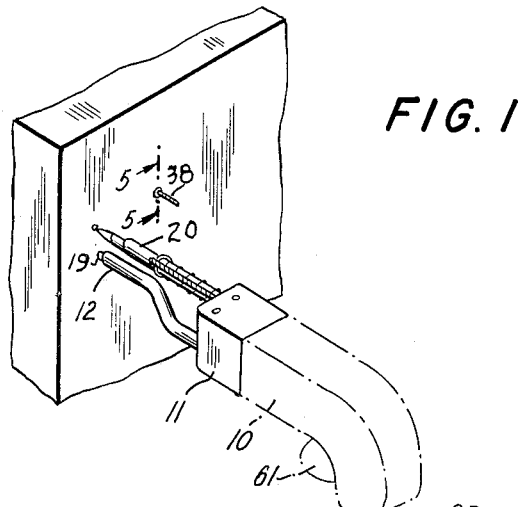
FIG. 1
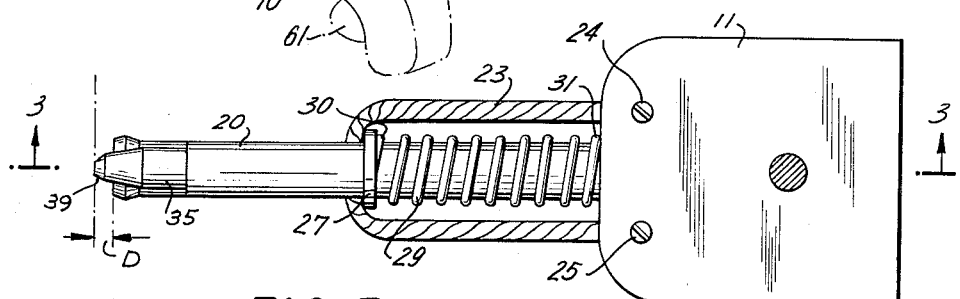
FIG. 2
FIG. 3
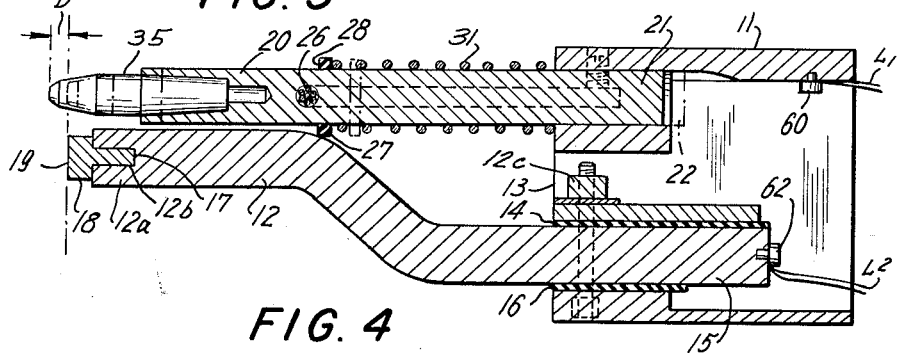
FIG. 4
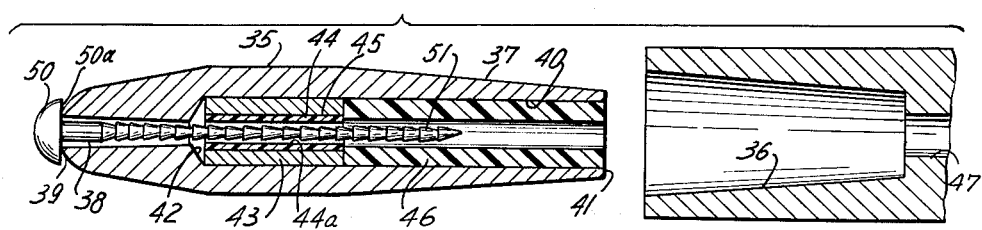
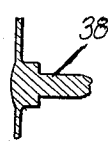
FIG. 5
INVENTOR.
MILTON HINDEN
BY
*J. F. Basseches*
*his* ATTORNEY

United States Patent Office 3,092,714
Patented June 4, 1963

3,092,714
WELDING APPARATUS
Milton Hinden, 15 Bay Link, Massapequa, N.Y.
Filed June 15, 1961, Ser. No. 117,391
6 Claims. (Cl. 219—101)

This invention relates to an electrical welding apparatus, and more particularly to an apparatus for electrical resistance welding.

Still more particularly, this invention relates to an apparatus for welding a pin or nail-like element to a thin sheet metal workpiece and to a novel pin holding chuck therefor.

Still more particularly, this invention relates to a welding apparatus having particular utility in the heating and air conditioning industry for applying insulation supporting pins to the outer surface of sheet metal air ducts.

A common method for insulating ducts carrying heated or cooled air is to secure nail-like pins at spaced points on the outer surfaces of such ducts. Sheets or batts of insulating material may then be secured to the duct by pressing the sheet against the duct whereby the extending points of the pins will penetrate the sheet. Retainer clips may then be slid over the extending points to fasten the sheet to the duct.

In welding a pin to a duct, which is commonly a relatively thin galvanized iron sheet of, for instance 16 gauge material, great care must be taken to assure that the pin is secured perpendicular to the surface of the duct. Also, it is important during the welding operation not to urge the head of the pin against the thin duct material with too much force, lest the duct material be weakened or even ruptured under the intense welding heat.

Since it is often desirable to weld the pins to the duct after the latter has been installed, it will be readily understood that the pin holding electrode must often be pointed vertically downwardly, as, for instance, when a pin is to be welded to the top surface of a horizontally disposed duct. In such instance, it is necessary to provide an electrode with some form of pin holder or chuck to prevent the pin from falling free of the electrode where the electrode may be pointed downwardly in use.

I have found it desirable, for efficiency in welding such small pins or nails to sheet metal, that if the electrical flow in the pin be concentrated in the head portion of the pin, that portion will be fused for attachment to the duct sheet metal. Hence, internal contacts between the chuck and the pin shank should and may be eliminated.

A further desirable characteristic of an electrode pin chuck is the ability of the chuck to retain a pin without the pin being inserted and positively held by the chuck or without requiring manual adjustment of the chuck to hold the pin. The last characteristic is important since, after repeated welding operations, the tip of the chuck becomes exceedingly hot. If the chuck were unable to hold the pin until the latter were fully inserted, i.e., until the under portion of the head of the pin touched the tip or end of the chuck, it would be necessary for the operator to take care in effecting full insertion to avoid touching the chuck. Accordingly, the chuck would be disengageable from the welded pin without manipulation to release the latter.

Accordingly, it is an object of the invention to provide an improved pin welding apparatus and chuck therefor for efficiently welding a pin or the like to a thin sheet metal workpiece, such as a duct.

A further object of this invention is to provide a resistance welder of the type described having the following desirable characteristics:

(a) Automatic alignment of the welded pin normal to the plane of the duct or other workpiece;

(b) Automatic feed or advancing of the pin head toward the duct or workpiece at a controlled pressure sufficient to assure adequate current flow and optimum weld conditions, without danger of rupture or breakthrough of a relatively thin workpiece;

(c) A pin holding electrode capable of retaining a partly or fully inserted pin shank without manipulation to hold the shank in the chuck or release the shank after welding;

(d) A pin holding electrode providing electrical connection to the pin in a manner to provide maximum current flow in the head portion of the pin, and eliminating wasteful diversionary current flow other than in the head or proposed point of contact whereby maximum welding efficiency is achieved, and unduly heavy welding apparatus, or long periods of current application are not required.

A further object of this invention is to provide a chuck for a pin welding device having the characteristics noted under (c) and (d) above.

To attain these objects and such further objects as may appear herein or be hereinafter pointed out, reference is made to the accompanying drawings, forming a part hereof, in which—

FIGURE 1 is a perspective view of a portable welding device in accordance with the invention and showing a duct portion to which an insulation retainer pin has been applied;

FIGURE 2 is a magnified horizontal section taken on the lines 2—2 of FIGURE 1;

FIGURE 3 is a vertical section taken on the lines 3—3 of FIGURE 2;

FIGURE 4 is a magnified pre-assembly view showing in detail the pin chuck and chuck receiver electrode portions;

FIGURE 5 is a magnified section taken on the lines 5—5 of FIGURE 1.

In accordance with the invention, I provide a welding device which may, as shown in FIGURE 1, take the general shape of a pistol grip 10 of dielectric material, having at its forward end a conductive electrode support block 11.

A first electrode 12 is fixed to the block 11, as by electrode straddling bolts 12c, which clampingly urge retainer block 13 against an interposed insulator sheet 14, thereby directing the shank portion 15 of electrode 12 against a further interposed insulation sheet 16 interposed between the shank 15 and the support block 11. Thus, the electrode 12 is firmly secured to the block 11 but is electrically insulated from said block. The outer end 12e of electrode 12 is provided with an axial bore 12f in which the shank portion 17 of electrode contact tip 18 is seated. The leading or outermost face 19 of tip 18 is flat or planar, for purposes which will become apparent.

A second electrode 20 is slidably longitudinally mounted to block 11, the shank portion 21 of said electrode being slidably received in bore 22 (see FIGURE 2a) formed in block 11. Electrode 20 is grounded to block 11 and also is held against removal in an outward direction from said block by flexible jumper cable 23, the ends of which cable are secured to block 11 by grounding bolts 24, 25, threaded into the block and clampingly engage said cable ends. Cable 23, at a central portion, passes through cross bore 26 formed in the electrode.

A fibre insulator washer 27 is sleeved over electrode 20, the outer or leading face 28 of said washer being pressed tightly against the portions of cable 23 which lie adjacent cross bore 26 by compressed core spring 29, the ends 30, 31 of which are biased against washer 27 and block 11, respectively. It will be readily understood that spring 29, acting against washer 27, serves to bias electrode 20 axially outwardly from block 11 and at the same time causes the portions of jumper cable 23 which pass through bore 26 to be tightly pressed against the said electrode, assuring a good electrical contact between the electrode 20 and block 11.

Electrode 20 is provided with a pin holding chuck 35 which is optionally but preferably separable from electrode 20. The electrode 20 is formed with a tapered bore 36, the chuck 35 being provided with a complementally tapered shank portion 37 adapted to fit securely within tapered bore 33.

The chuck 35 has a narrow boring 38 extending axially inwardly from tip 39, which is sharp, thin walled at terminal end and extends part way through the chuck 35. A wider counter boring 40, beginning at the inner end 41 of the chuck, extends co-axially with boring 38, intersecting the latter and defining an annular shoulder 42 at the junction of bores 38, 40.

An annular or cylindrically shaped permanent magnet 43 of alnico or like magnetic alloy is sleeved into bore 40 until the leading edge of the magnet lies against shoulder 42. A thin insulating liner sleeve 44 is thereupon inserted into the annular aperture 45 of magnet 43. The inner diameter 44a of sleeve 44 is preferably smaller than the boring portion 38 of chuck 35. A heavy annular insulating sleeve 46 is then forced into bore 40, frictionally engaging the walls of said bore and thereby retaining the magnet 43 and sleeve 44 against displacement. The bore 36 of electrode 20 may have a co-axial bore extension 47 to accommodate exceptionally long pins for welding.

The pins P to be utilized with the welding device may comprise any suitable iron containing alloy. The pins include a semi-spherical head portion 50 having a planar shoulder 50a and of greater cross section than the pin shank portion 51, which latter portion may, as shown in FIGURE 4, be provided with a series of friction rings, serrations or threading, to receive insulation retainer clips (not shown).

One secondary lead L1 from a welding transformer (not shown) is grounded by bolt 60 to the conductive block 11. The other transformer secondary lead L2 is connected to electrode 12. The welding device is energized by actuation of trigger switch 61. Closing of switch 61 energizes the transformer primary for a period determined by the setting of an adjustable timer (not shown) which is of known construction.

The welding period selected will depend on such factors as size of the pin and gauge of the duct, and will normally last for about a third of a second where a pin having a 14 gauge shank is to be welded to an 18 gauge duct, for example.

In operation, a pin or nail P is inserted, shank first, part way into bore 38 of the chuck 35. The chuck will be effective to retain the partially inserted pin by reason of the magnetic attraction between magnet 43 and pin shank 51. The welding device is then pressed against the duct at the desired point of affixation of the pin. The initial pressing action aforesaid will seat the underside of pin P firmly against tip 39 of chuck 35, although, as previously indicated, the holding action of chuck 35 takes place even prior to the full seating of pin P.

As the block 11 is pressed toward duct D, the electrode 20 is bodily shifted axially inwardly into bore 22 of block 11 from the solid line position to the dot and dash position of FIGURE 3, further compressing spring 29. The pressure which may be imparted to the head 50 of pin P is limited by reason of the engagement of the planar tip 19 of electrode 12 against the duct. As the electrode 20 is linearly extended by spring 29 in a direction normal to the plane of the tip 19, a perpendicular attachment of the pin to the duct is assured by pressing the tip 19 flat against the duct side. When the unit is pressed against a duct, the relatively sharpened tip 39 of chuck 35 provides a good electrical connection with the head of the pin P. By utilizing a rounded or sharpened tip, the possibility of grease, grit or the like interfering with the connection between the chuck and the head is minimized. Also, by maintaining the pin shank free of any internal connection with the chuck, a maximum current flow in the head portion of the pin is achieved where the thin terminal engages the planar shoulder 50a.

During the welding cycle, current flows through electrode 12, tip 19, duct D, pin head 50, chuck 35, and electrode 20. As the head portion 50 is melted or fused, the manual pressure to overcome the spring biased chuck 35 urges the pin toward the duct. A secure connection is assured by the spring controlled advance of the pin and by feeding the pin by urging against the head portion as opposed to the shank, since in the latter case there would be danger of forcing the shank through the melted head portion and the duct. Also, movement by the shank portion might result in a relative movement between the shank and the molten metal at the moment current is shut off, thereby causing a weakened or crystalline condition at the point of securement.

As shown in the illustrated embodiment, the chuck 35 is removable from electrode 20. This arrangement is desirable since, after protected periods of use in proximity to the heavy alternating current flow encountered in welding, magnet 43 loses its strength and must either be replaced or remagnetized.

While the unit is illustrated in a portable, pistol type housing, it will be readily understood that for factory use a sling support will be found preferable. After welding is completed, the unit is simply removed, a new pin charged into the chuck, and the unit re-positioned.

By my invention, in spring projecting the pin or nail holding electrode a predetermined distance D in relation to the contact tip 18, a pressure relationship is established before contact of the electrodes to the work is effected to assure normal positioning of the pin or nail to the sheet metal to assure speedy welding without distorting the sheet metal to which the nail head is affixed.

Likewise, by insulating the nail shank to localize the contact at the terminal portion of the chuck, excessive heat transfer is minimized to permit repeated welding operations without manipulation of the chuck, comfortably and without special precautions to avoid union of the pin or nail to any portion of the chuck, economically and speedily effecting the welding operation completely to one side of a surface, as an exposed duct after it has been positioned.

Still further, by magnetic loading and securement within the chuck, rapid operation without contact with the chuck is possible so that the high temperature changes which may be encountered at the electrodes are not restraining factors.

Having thus described the invention and illustrated its use, what is claimed as new and desired to be secured by Letters Patent is:

1. A pin holding electrode device for holding a pin having shank and head portions during welding by the spot welding method comprising a conductive electrode, a bore beginning at the tip of said electrode and extending inwardly thereof, said bore adjacent said tip being of a diameter to provide clearance with respect to the shank of said pin but of lesser diameter than the head of said pin, the inwardly disposed portions of said bore being of enlarged diameter as compared with the diameter of the bore adjacent said tip, a permanent magnet carried in said bore in said enlarged diameter portion and insulator means interposed in said enlarged diameter portion of said bore having a central aperture co-axially located with and of a lesser diameter than the diameter of said bore adjacent said tip, whereby a pin having its shank portion inserted into said bore and through said aperture, and having the end of its head portion pressed against a workpiece will be maintained by said insulator means free from electrical connection with said electrode except at the junction of said tip and said head.

2. A welding device for welding a pin having a shank portion and a head portion by the resistance welding method to a relatively thin, flat workpiece comprising electrode support means, a first electrode fixedly extending from said support means and terminating in a substantially planar end portion, a second electrode adjacent said first electrode carried by said support means to be axially slidable in a direction normal to the end portion of said first electrode, spring means biasing said second electrode axially outwardly of said support means, to project the tip of said second electrode beyond said end portion of said first electrode, a bore formed in said second electrode extending axially inwardly from said tip, said bore adjacent said tip being of a diameter to provide clearance with respect to the shank of said pin but being of a lesser diameter than the head of said pin, the inwardly disposed portions of said bore being of enlarged diameter as compared with the diameter of said bore adjacent said tip, and insulator means interposed in said enlarged diameter portion of said bore having a central aperture co-axially located with and of a lesser diameter than the diameter of said bore adjacent said tip and spaced from said tip a distance less than the length of said shank, whereby when said end portion of said first electrode is forced against a flat workpiece, said tip of said second electrode is urged by said spring means against said head portion surrounding the junction of said head and said shank, and said shank portion is maintained clear of internal electrical contact with said electrode by said insulator.

3. A device in accordance with claim 2 wherein a permanent magnet is carried by said second electrode, to lie adjacent the shank portion of said pin in said bore.

4. A device in accordance with claim 3 wherein said permanent magnet is annular in form and is co-axially supported in said bore in position whereby said shank portion of said pin extends through said magnet without contacting the latter.

5. A chuck in accordance with claim 1 wherein said permanent magnet is annular in form and is co-axially supported in said bore in position whereby said shank portion of said pin extends through said magnet without contacting the latter.

6. A device is accordance with claim 2 wherein said tip of said second electrode is bevelled to provide a sharp area of contact between said chuck and said pin head.

References Cited in the file of this patent
UNITED STATES PATENTS

| | | |
|---|---|---|
| 1,045,332 | Sheffer | Mar. 26, 1912 |
| 1,109,592 | Morgan | Sept. 1, 1914 |
| 1,354,293 | Gravell | Sept. 28, 1920 |
| 2,049,312 | Palmer | July 28, 1936 |
| 2,110,932 | Hogg et al. | Mar. 8, 1938 |